March 28, 1950  C. M. SAVRDA  2,502,175
APPARATUS FOR DECAPITATING FISH
Filed Oct. 24, 1944  3 Sheets-Sheet 2
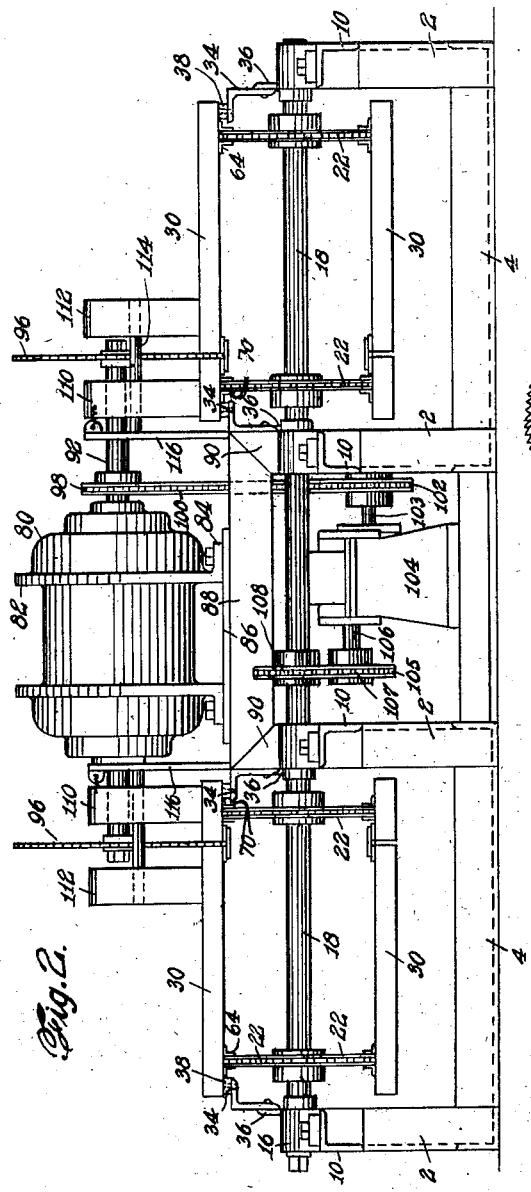
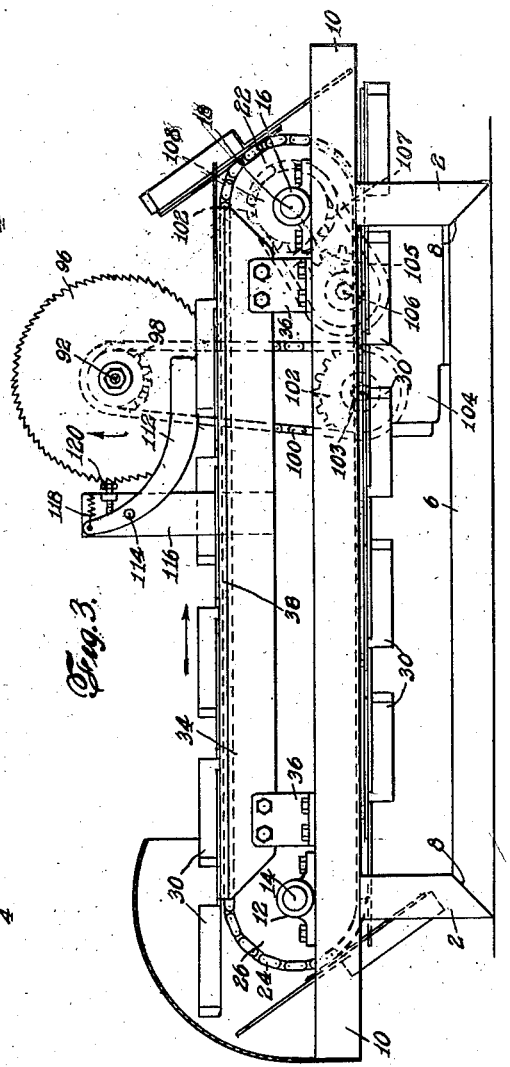
INVENTOR.
CHARLES M. SAVRDA
ATTORNEY.

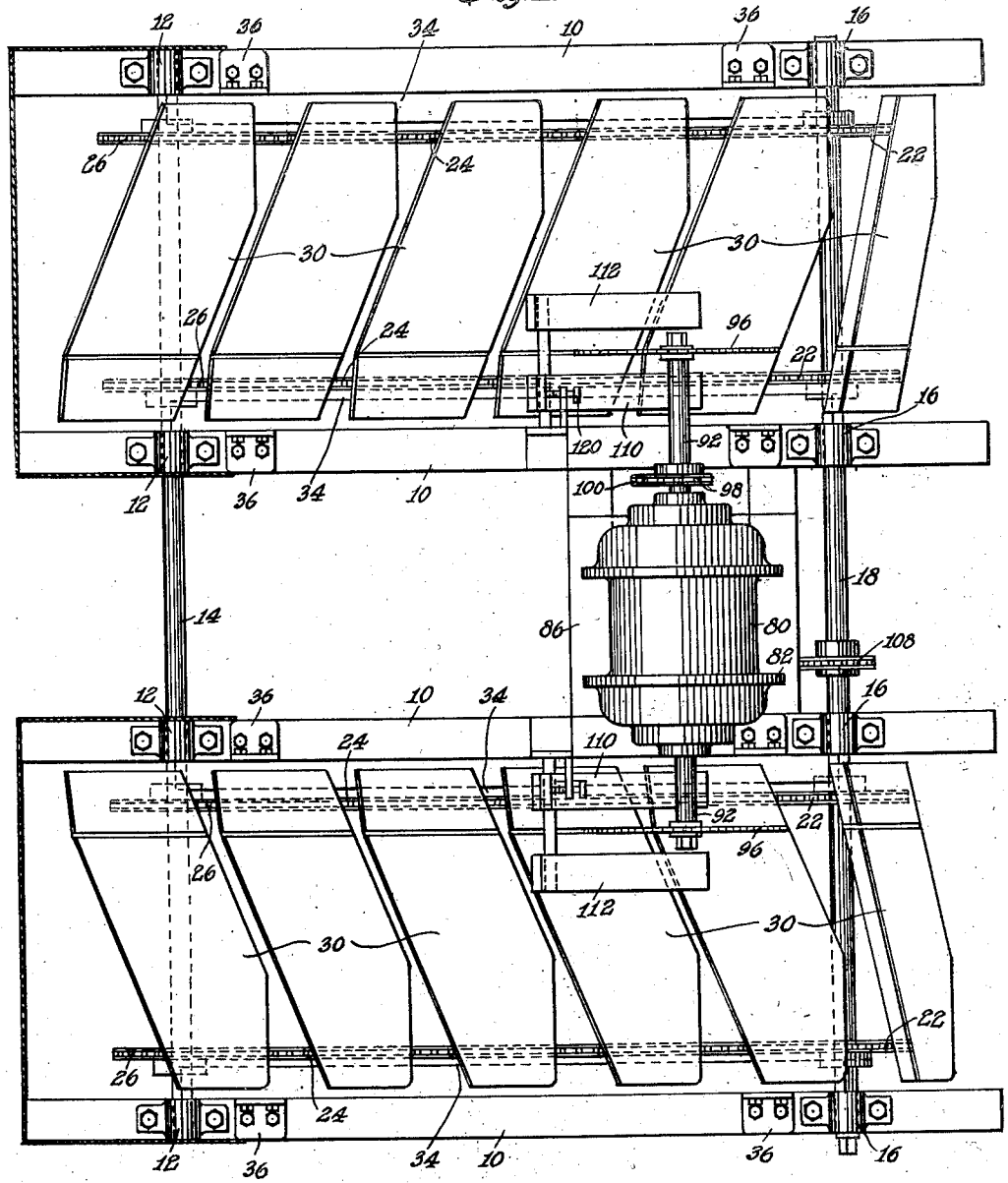

March 28, 1950  C. M. SAVRDA  2,502,175
APPARATUS FOR DECAPITATING FISH
Filed Oct. 24, 1944  3 Sheets-Sheet 3
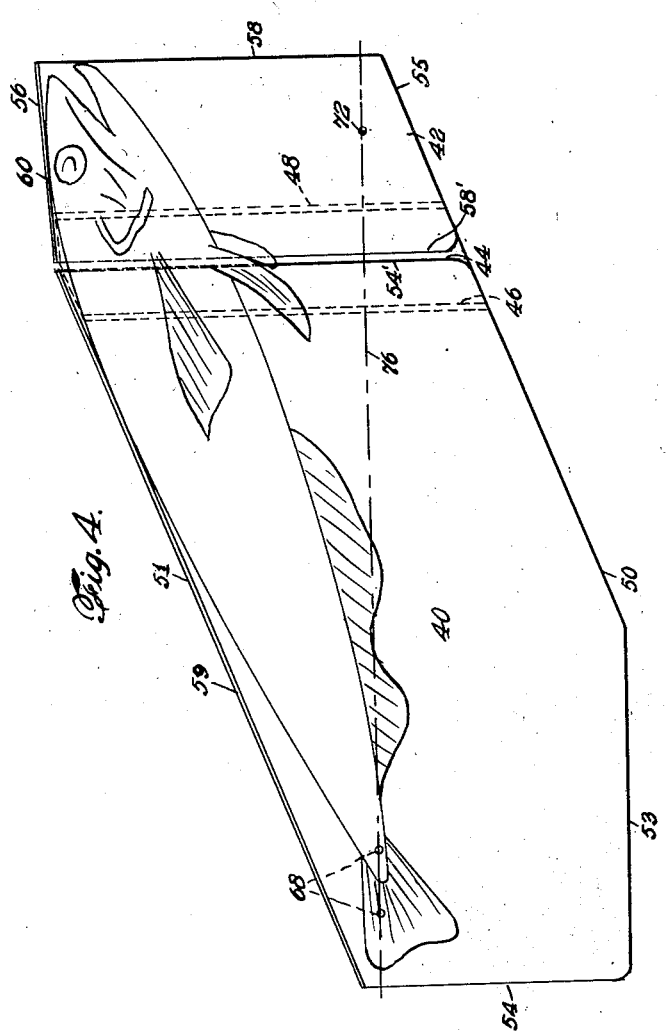
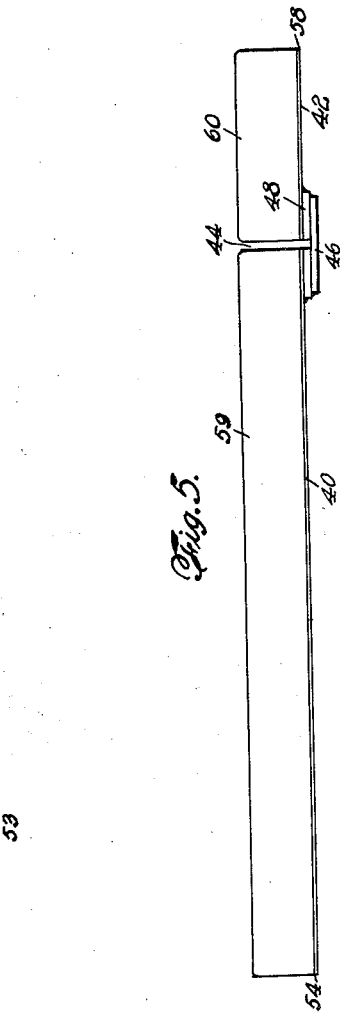
INVENTOR.
CHARLES M. SAVRDA
BY Wm. S. Pritchard
ATTORNEY.

Patented Mar. 28, 1950

2,502,175

UNITED STATES PATENT OFFICE 2,502,175

APPARATUS FOR DECAPITATING FISH

Charles M. Savrda, Bay Shore, N. Y., assignor, by mesne assignments, to Fish Machinery Corporation, Boston, Mass., a corporation of Delaware Application October 24, 1944, Serial No. 560,095

5 Claims. (Cl. 17—4)

This invention relates to a fish treating machine and more particularly to an apparatus for decapitating fish.

In the filleting of fish by machines of the type disclosed in U. S. Patent 2,149,021, it is advantageous if the fish is decapitated prior to its introduction into the filleting machine. Usually, the decapitation of the fish has been performed manually. Obviously, such a beheading operation is not only tedious but relatively expensive. The art has long sought a simple machine which will decapitate fish with a minimum amount of waste.

An object of this invention is to provide a new and improved machine for decapitating fish.

Another object of this invention is to provide a machine for decapitating fish with maximum recovery.

An additional object of this invention is to provide a machine having a plurality of fish carriers secured in spaced relationship to an endless conveyer which conveys the fish disposed on said carriers through the zone of action of a rotating circular knife.

A further object of this invention is to provide a fish carrier having a head support and a body support.

A still further object of this invention is to provide a fish carrier having means at its rear edge to retain the fish in position on the carrier.

A still further object of this invention is to provide means which engage and hold the fish at the top thereof during the beheading operation.

A still further object is to provide a fish carrier having the head support and the body support thereof in spaced relationship to permit the rotating knife to extend and pass therebetween to completely decapitate the fish without damaging the knife.

Other and additional objects will appear hereinafter.

The objects are accomplished, in general, by providing a plurality of fish carriers arranged in spaced relationship and secured to an endless conveyer which conveys the fish carriers successively through the zone of action of a rotating circular knife whereby each fish positioned on the carriers is decapitated as it passed respectively through the zone of action of the rotating knife. The fish is positioned on the respective carrier so that the cutting action of the knife is from the belly side to the back of the fish.

Each carrier comprises a head support and a body support disposed in spaced relationship to form a channel therebetween whereby, during the decapitating operation, the knife passes into said channel to assure complete severance of the head from the body of the fish.

Each fish carrier is provided at its rear edge with an upstanding flange which cooperates with the back of a fish disposed adjacent thereto and prevents the fish from being pushed or falling from the carrier during conveyance thereof to the knife and the decapitating operation. The rear edge and the flange of each carrier is of a shape generally complemental to the shape of the back of a fish, and when a fish is placed on the carrier it is positioned with the back thereof in close relationship to the flange and the side fin just above the channel.

Each fish carrier is formed of a shape and so disposed relative to the conveyer that, when a fish is disposed thereon and fed through the zone of action of the knife, the head will be severed from the body by a cut which is at an angle to the backbone of the fish.

Means are also provided to engage and hold both the head and body of the fish in position during the decapitating operation.

In the preferred embodiment, there is provided a single motor having a shaft extending on opposite sides thereof and a circular rotating knife adjacent each end of the shaft. A separate, but identical, fish conveying mechanism is provided to cooperate with each knife.

The present invention will be more clearly understood by reference to the following detailed description when taken in connection with the accompanying drawings, in which:

Figure 1 is a top plan view of an apparatus embodying the principles of this invention;

Figure 2 is an end elevation of the apparatus shown in Figure 1;

Figure 3 is a side elevation of the apparatus shown in Figure 1;

Figure 4 is an enlarged plan view of the fish carrier; and

Figure 5 is a front elevation of the fish carrier shown in Figure 4.

As above explained and as is apparent from Figures 1 and 2 of the drawings, the instant apparatus is provided with two rotary knives driven from a single motor and separate, but identical, units for conveying the fish to the respective knife. Accordingly, only one fish conveying unit will be described, but reference numerals designating similar parts in both units will be applied to the drawings.

Referring now to the drawings wherein like reference numerals designate like parts, the reference numeral 2 designates spaced vertically disposed angles adjacent each end of the apparatus and which constitute the upright members of the frame on which the various mechanisms of the apparatus are mounted. The uprights 2 at each end of the apparatus are secured together, as by welding, by end (cross) pieces 4, which are also angles. A longitudinal member 6, formed of an angle and constituting a side member, secures the uprights 2 at the opposite ends of the machine. As shown in Figure 3, the joints 8, formed by the uprights 2 and the longitudinal member 6, are welded and mitered. A longitudinal member 10 is also secured to the tops of the vertical members 2 and extends longitudinally of the machine from the delivery to the exit side thereof. The longitudinal member 10 is in the form of an angle and is secured to the uprights 2 in any convenient manner, such as by welding.

On each of the longitudinal members 10 adjacent the feed end of the machine, there is secured a bearing 12 in which an idler shaft 14 is rotatably journaled. On each of the longitudinal members 10 adjacent the exit side of the machine, there is also provided a bearing 16 in which a driving shaft 18 is rotatably journaled. It is to be noted that both of the shafts 14 and 18 extend transversely of the machine and constitute the shafts for both units. At the delivery end, the shaft 18 is provided with a pair of spaced sprocket wheels 22 which are adapted to cooperate with a pair of spaced chains 24. The chains 24 extend from the sprockets 22 to a pair of sprockets 26, keyed to the idler shaft 14 at the feed end of the machine.

As is shown in Figure 1, a plurality of fish carriers, generally designated by the reference numeral 30, are secured to the chains 24, as will be hereinafter more fully described. A rail support 34 extending longitudinally of the machine is carried by a pair of spaced brackets 36 mounted on the longitudinal member 10. Each rail support 34 is provided with a rail 38 extending longitudinally of the machine and over which the fish carriers 30 ride. It is to be noted that a rail support 34 and a rail 38 is provided to cooperate with the fish carriers 30 adjacent each end thereof.

Referring now to Figures 4 and 5 wherein a fish carrier is shown, the reference numeral 40 designates the fish body support and the reference numeral 42 designates the head support. The body support 40 and the head support 42 are in spaced relationship, there being a channel 44 therebetween. As is shown in Figure 5, the body support 40 and the head support 42 are secured together by means of a strip 46 which is welded to a spacer 48, the latter being welded to both the head and body supports. The spacer 48 is formed of two pieces disposed in spaced relationship to form a channel which is in alignment with the channel 44. As shown in Figure 4, the body support 40 and the head support 42 are rounded at their respective corners adjacent the entry end of the channel 44.

The body support 40 is pentagonal in shape, the edge 50 and the edge 51 being parallel and at an angle of approximately 22° to the horizontal axis of the carrier. The edge 53 is parallel to the horizontal axis and the side edges 54 and 54' are parallel to each other and perpendicular to the horizontal axis. The head support 42 is in the shape of a trapezoid, the front edge 55 thereof being in alignment with the edge 50 of the body support and the rear edge 56 thereof being at an angle less than that of the rear edge 51 of the body support. In the form shown, the rear edge of the head support is at an angle of approximately 5° to the horizontal axis of the carrier. The side edges 58 and 58' are parallel to each other and perpendicular to the horizontal axis of the carrier.

From the foregoing description and as shown in Figure 4, the rear edge of the fish carrier 30 is formed of two straight line portions so disposed relative to each other that adjacent the channel 44 it approximates the curvature of a fish, particularly that portion at the back thereof where the head joins the body.

In order to maintain the fish in proper position, the rear edge 51 of the body support 40 and the rear edge 56 of the head support 42 are provided with upstanding flanges 59 and 60 respectively. The flanges 59 and 60 are of a height which extends slightly above the backbone of a fish. It is to be noted that the flanges 59 and 60 are spaced to the same extent that the body support 40 is spaced from the head support 42 and the channel formed thereby is in alignment with the channel 44.

As previously mentioned, each fish carrier is respectively secured to each of the chains 24. Each body support 40 is secured to the chain by a pair of lugs 64 which are mounted in the holes 68 formed therein adjacent the top edge 51 and the side edge 54 of the body support. Each head support 42 is secured to the other chain disposed therebeneath by a single lug 70 secured in the hole 72 formed therein adjacent the lower edge 55 and approximately equidistant between the side edges 58 and 58'.

As is shown in Figure 4, the holes 68 and 72 respectively are in alignment on a horizontal line designated by the reference numeral 76. Thus, when each carrier 30 is secured to the chains, it will be angularly positioned, as shown in Figure 1, for reasons which will become apparent hereafter.

Adjacent the delivery end, there is provided a motor 80 having a pair of supporting rings 82. The supporting rings 82 are provided with flanges 84 at the bottom thereof and are disposed on a motor plate 86. The motor plate 86 is positioned on a pair of spaced angles 88. The angles 88 are secured, as by welding, to angles 90 which are carried on the support 10.

The shaft 92 of the motor extends from opposite sides thereof and adjacent each end thereof there is secured in an appropriate manner a toothed circular rotating knife 96. Each knife 96 is so disposed as to pass through the channel 44 when the fish carrier is passed therebeneath.

On the motor shaft 92 there is provided a sprocket 98 over which a chain 100 is trained. The chain 100 cooperates with a sprocket 102 secured to the shaft 103 of the speed reducer 104. A sprocket 105 is secured on a shaft 106 at the output end of the speed reducer 104. A chain 107 is trained over the sprocket 105 and over a sprocket 108 secured to the shaft 18. It is thus apparent that when the motor is energized it will not only operate the knives 96 but will also drive the shaft 18, whereby movement will be imparted to the chains carrying the fish carriers 30 in both of the fish conveying units. It is to be noted that the direction of travel of the knives is opposite to the direction of travel of the conveyers.

In order to maintain the fish in position on its respective carrier 30 during the decapitating action, there is provided a pair of hold-down members 110 and 112, the hold-down member 110 being adapted to engage the head of the fish and the hold-down member 112 being adapted to engage the body of the fish while the fish passes through the zone of action of the cutting knives 96. As shown in Figure 3, each of the hold-down members 110 and 112 are arcuate in form and both are secured on a shaft 114 which is rotatably mounted on a support 116 secured adjacent its lower end to the rail support 34. The support 116 is in the form of an angle and springs 118, having one of their ends secured to the top of the hold-down members 110 and 112 and the other of their ends secured to the supports 116, serve to urge the hold-down members downwardly. Stop screws 120 limit the downward movement of the hold-down members.

In operation, a fish is disposed on each of the fish carriers with the back thereof in close relationship to the flanges at the rear edge thereof and with a side thereof flat on the carrier and also with the side fin on the head support closely adjacent the channel but sufficiently spaced therefrom for the knife to clear the same. Due to the rotation of the chains 24, each fish carrier 30 is conveyed successively to and through the zone of action of the cutting knives. The hold-down members 110 and 112 engage the fish at the head and body thereof while the cutting knife 96 severs the head from the body. It is to be noted that, due to the disposition of the fish on the support, the severing action is from the belly side to the back. Since the knife 96 extends and passes through the channel 44 and into the channel of the spacer 48 secured to the bottom of the fish carrier 30, the knife will completely sever the head from the body. Due to the angular arrangement of the fish carrier 30 on the conveyers, the decapitation will be at an angle to the backbone and maximum recovery will be obtained.

In the embodiment hereinbefore described, the shapes of the body supports 40 and the head supports 42 are pentagonal and trapezoidal respectively. The invention is not restricted to body supports and head supports of such specific shapes. In general, the respective shapes of the body supports and head supports may be of any geometrical form provided the rear edges thereof form, adjacent the channel, a curve which approximates the curvature of a fish at the back thereof where the head joins the body. Likewise, the body and head supports may be of any geometrical shape if flanges are provided which form a curve which approximates the curvature of the back of a fish at the back thereof where the head joins the body.

Though in the foregoing description the frame is described as being formed of angles welded together, it is obvious that the invention is not restricted to such a frame. The invention is applicable with any type frame irrespective of its construction.

The instant invention provides a machine which is relatively simple in construction and which will decapitate fish economically and with a high recovery.

Since it is obvious that various changes and modifications may be made in the above description without departing from the nature or spirit thereof, this invention is not restricted thereto except as set forth in the appended claims.

I claim:

1. A fish decapitating machine comprising a pair of parallel endless chains constituting a conveyer, a plurality of fish carriers, each of said fish carriers having a head-supporting portion secured to one chain, and a body-supporting portion secured to the other chain, said portions lying in the same plane but being spaced from one another to form an intervening straight channel extending parallel to said chains, said channel being disposed nearer to said one chain than to said other chain, rear flanges extending upwardly from said supporting portions, said flanges being inclined relative to one another and the flange on said body-supporting portion being inclined forwardly relative to a vertical plane perpendicular to said channel and passing through the rear end of said channel whereby when a fish is disposed on said carrier with its back in contact with said rear flanges the backbone will be inclined relative to said channel, a rotary circular knife adapted to pass through said channel when a fish carrier passes through the zone of action of said knife and means to drive said conveyer to cause said fish carriers to pass successively through the zone of action of said knife to decapitate fish carried on said carriers by a cut extending from the belly side to the back side at an angle to the backbone of each fish.

2. A fish decapitating machine as claimed in claim 1, wherein the rear flange on said head-supporting portion is also inclined relative to said vertical plane.

3. A fish decapitating machine as claimed in claim 1, wherein the rear flange on said head-supporting portion is also inclined relative to said vertical plane and extends rearwardly from its inner end adjacent said channel to its outer end.

4. A fish decapitating machine comprising a pair of parallel endless chains constituting a conveyer, a plurality of fish carriers, each of said fish carriers having a head-supporting portion secured to one chain and a body-supporting portion secured to the other chain, said portions lying in the same plane, and an intervening depressed portion joining said supporting portions and forming a straight channel extending parallel to said chains, said channel being disposed nearer to said one chain than to said other chain, rear flanges extending upwardly from said supporting portions, said flanges being inclined relative to one another and the flange on said body-supporting portion being inclined forwardly relative to a vertical plane perpendicular to said channel and passing through the rear end of said channel, whereby when a fish is disposed on said carrier with its body portion in contact with said rear flanges the backbone will be inclined relative to said channel, a rotary circular knife adapted to pass through said channel when a fish carrier passes through the zone of action of said knife and means to drive said conveyer to cause said fish carriers to pass successively through the zone of action of said knife to decapitate fish carried on said carriers by a cut extending from the belly side to the back side at an angle to the backbone of each fish.

5. A fish decapitating machine as claimed in claim 4 wherein the rear flange on said head-supporting portion is also inclined relative to said vertical plane.

CHARLES M. SAVRDA.

REFERENCES CITED

The following references are of record in the file of this patent:

UNITED STATES PATENTS

| Number | Name | Date |
| --- | --- | --- |
| 1,539,300 | Christiansen | May 26, 1925 |
| 1,628,765 | Bergen | May 17, 1927 |
| 1,632,200 | Stafford | June 14, 1927 |
| 1,828,725 | Muller et al. | Oct. 20, 1931 |
| 2,326,146 | Kurzbin | Aug. 10, 1943 |
| 2,423,174 | Brown | July 1, 1947 |